(12) United States Patent
Ranganath et al.

(10) Patent No.: US 8,538,909 B2
(45) Date of Patent: Sep. 17, 2013

(54) TEMPORAL RULE-BASED FEATURE DEFINITION AND EXTRACTION

(75) Inventors: Venkatesh-Prasad Ranganath, Bangalore (IN); Piyush Goyal, Dhuri (IN); Pradip Harindran Vallathol, Thrissur (IN); Ganesan Ramalingam, Bangalore (IN)

(73) Assignee: Microsoft Corporation, Redmond, WA (US)

( * ) Notice: Subject to any disclaimer, the term of this patent is extended or adjusted under 35 U.S.C. 154(b) by 387 days.

(21) Appl. No.: 12/972,273

(22) Filed: Dec. 17, 2010

(65) Prior Publication Data

US 2012/0159263 A1    Jun. 21, 2012

(51) Int. Cl.
*G06F 17/00* (2006.01)
*G06N 7/00* (2006.01)

(52) U.S. Cl.
USPC .............................................. 706/58; 706/47

(58) Field of Classification Search
None
See application file for complete search history.

(56) References Cited

U.S. PATENT DOCUMENTS

| | | | |
|---|---|---|---|
| 5,373,486 A | 12/1994 | Dowla et al. | |
| 7,251,584 B1 * | 7/2007 | Perazolo et al. | 702/183 |
| 7,509,298 B2 * | 3/2009 | Chandra et al. | 706/52 |
| 7,577,963 B2 | 8/2009 | O'Farrell et al. | |
| 7,941,616 B2 * | 5/2011 | Rajamani et al. | 711/152 |
| 8,280,899 B2 * | 10/2012 | Lo et al. | 707/763 |
| 2004/0024773 A1 | 2/2004 | Stoffel et al. | |
| 2004/0153288 A1 | 8/2004 | Tovinkere et al. | |

FOREIGN PATENT DOCUMENTS

WO    2004028131 A1    1/2004

OTHER PUBLICATIONS

Vilalta, et al., "Predicting Rare Events in Temporal Domains", Retrieved at << http://www2.cs.uh.edu/~vilalta/papers/icdm02.pdf >>, Proceedings IEEE International Conference on Data Mining, ICDM, 2002, pp. 8.
Laxman, et al., "A survey of temporal data mining", Retrieved at << http://research.microsoft.com/pubs/71389/LSU06-sadhana.pdf >>, Sadhana, Academy Proceedings in Engineering Sciences, vol. 31, Apr. 2006, pp. 173-198.

* cited by examiner

*Primary Examiner* — Michael B Holmes
(74) *Attorney, Agent, or Firm* — Lyon & Harr, LLP; Mark A. Watson

(57) ABSTRACT

A temporal rule-based feature extraction system and method for extracting features from temporal-based rules satisfied by a trace. Once a temporal-based rule is found that is satisfied by the trace, then embodiments of the temporal rule-based feature extraction system and method leverage that rule to either use as a feature or to extract additional features. The extracted feature then is used to characterize the trace. Embodiments of the system include a feature definition module, which defines features based on the temporal-based rules satisfied by a trace, and a similarity measure module, which defines a similarity measure for the defined features. The defined features include both extrinsic features, which are based on extrinsic properties of the rule, and intrinsic features, which are based on intrinsic properties of the rule. The similarity module generates similarity measures that indicate the similarity of two traces.

19 Claims, 8 Drawing Sheets

TEMPORAL RULE-BASED FEATURE DEFINITION AND EXTRACTION

BACKGROUND

Many types of data contain sequences. For example, the network packets sent on the network interface, the order of function calls made by an application, the order in which a user clicks on a website, all contain sequences. In each of these examples, mostly one event (such as clicking on a link or calling a particular function) occurs at a point in time. Thus, there is a clear temporal ordering between each event.

In this type of data each event has a temporal ordering. A sequence of events is known as a trace. One way to analyze a large data set for a particular purpose is to analyze the data based on the features that best describe the data in a manner that is relevant to the purpose. This can be achieved by transforming the data into a reduced representation set of features (called a features vector). The act of transforming the data into the set of features is known as feature extraction. Feature extraction involves simplifying the amount of resources used to describe a large set of data accurately.

Once the features are extracted they can be used to process the traces. This processing can involve classifying a trace (to determine whether a trace belongs to a certain group or class of traces), clustering similar traces, and fingerprinting the traces. Fingerprinting is a process that maps a large amount of data to a much smaller data string that uniquely identifies the large amount of data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the temporal rule-based feature extraction system and method extract features from temporal-based rules satisfied by a trace. Embodiments of the system and method perform feature extraction that is based on the temporal relationship of events in a specific trace. When a temporal rule is found that is satisfied by the trace, then that rule is leveraged either as a feature or to extract additional features. The extracted feature then is used to process and characterize the trace.

Embodiments of the temporal rule-based feature extraction system include a feature definition module, which define features based on the temporal-based rules satisfied by a trace, and a similarity measure module, which defines a similarity measure for the defined feature. The feature definition module includes an extrinsic feature module, which defines extrinsic features by leveraging extrinsic properties of the rule that are independent of an internal structure of the rule, and an intrinsic feature module, which defines intrinsic features by leveraging intrinsic properties of the rule that are dependent on the internal structure of the rule.

The extrinsic features defined by embodiments of the temporal rule-based feature extraction system and method include a rule set feature and a rule frequency feature. The rule set feature is based on one or more temporal-based rules themselves. The rule frequency feature is defined using a normalized support for each rule in a set of temporal-based rules and then mapping each rule to their normalized supports.

The intrinsic features defined by embodiments of the temporal rule-based feature extraction system and method include a distance feature and a distance frequency feature. The distance feature is defined by computing a set of abstraction position pairs for a rule and computing a summary of distance measures of the pairs by using a summarizing function. An abstraction position pair is a pair of abstraction (or event) positions used to calculate distance statistics. For example, consider the ordering A→B→C. This ordering has three abstraction positions (namely, 1, 2, and 3) that are occupied by A, B, and C, respectively. In the context of a distance feature, pairs of these abstraction positions are considered for the purpose of calculating the distance statistics. For example, in the trace AXXXXXBYYYC that contains a witness for the ordering A→B→C, the distances for the abstraction position pairs (1,2), (2,3), and (1,3) are 5, 3, and 9, respectively. The distance feature then is generated as a mapping of each pair to the summary of distance measures given by the summarizing function. The distance frequency feature is defined by computing witness distances as a collection of distance between the abstraction position pair of each witness to the rule and then mapping the witness distances to a normalized frequency.

Embodiments of the similarity measure module include a rule set based similarity measure module, a rule frequency based similarity measure module, a distance based similarity measure module, and a distance frequency based similarity measure module. The rule set based similarity measure module generates a rule set based similarity measure module that depends both on a similarity and a dissimilarity between two traces. The rule frequency based similarity measure module generates a rule frequency based similarity measure that compares frequency distributions of rules between two traces. In essence, this similarity measure is used to determine a closeness between the two traces.

The distance based similarity measure module generates a distance based similarity measure that depends on distance between distance features of two traces. The distance computation performed can be based on a mean of a distance between abstraction position pairs or based on both the greatest and least distance between the abstraction position pairs. The distance frequency based similarity measure module generates a distance frequency based similarity measure that compares a frequency distribution of a temporal-based rule to other rule frequency distributions of other traces.

Embodiments of the temporal rule-based feature extraction system and method also include a comparison module processes traces, the defined features, and the similarity measures. In particular, based on the defined features, one or more traces can be compared using the similarity measures. This comparison can be used to classifying, cluster, or fingerprint one or more traces.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

DETAILED DESCRIPTION

Figure 1:
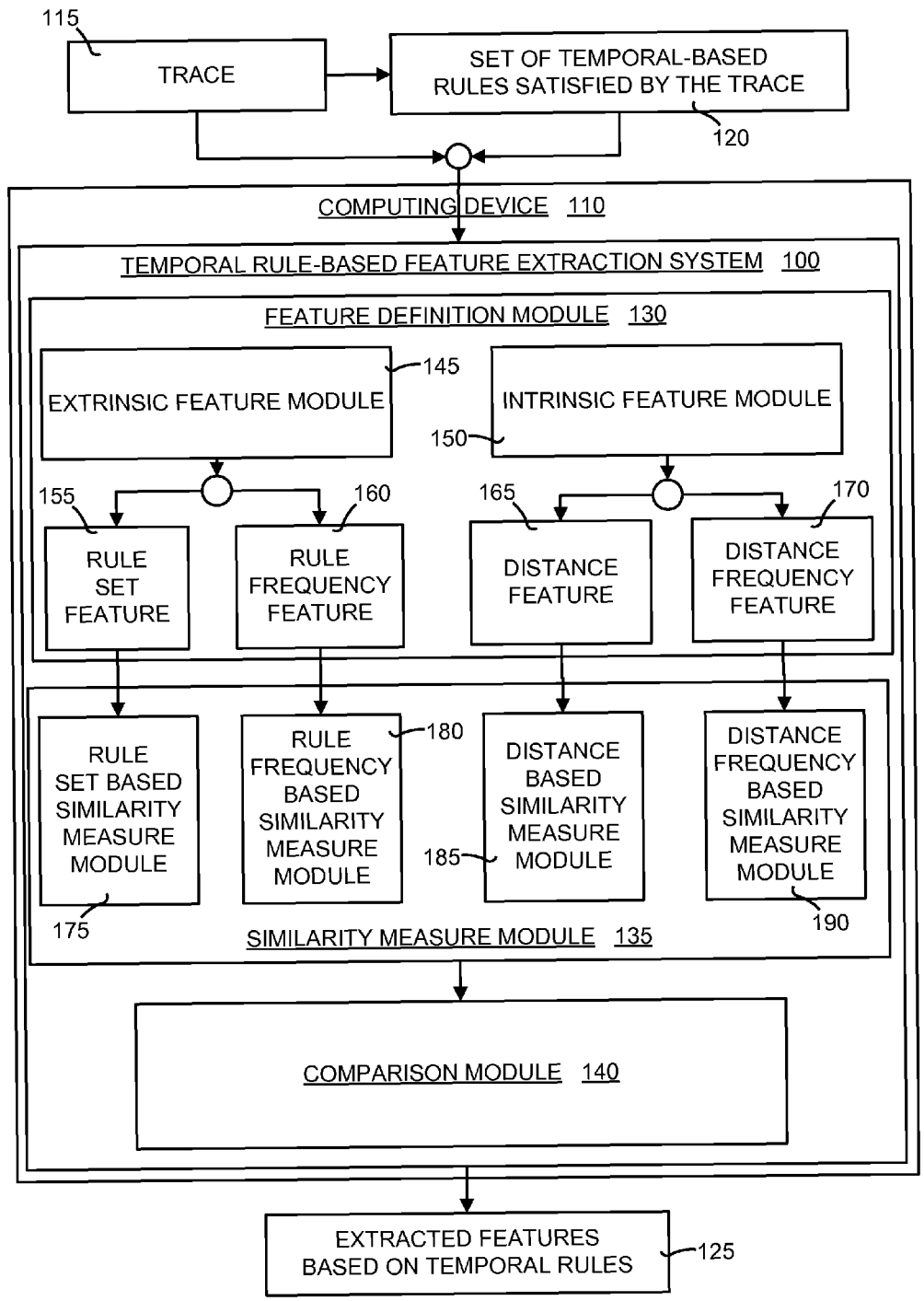
FIG. 1 is a block diagram illustrating a general overview of embodiments of the temporal rule-based feature extraction system and method implemented on a computing device and in a computing environment.

In the following description of embodiments of a temporal rule-based feature extraction system and method reference is made to the accompanying drawings, which form a part thereof, and in which is shown by way of illustration a specific example whereby embodiments of the temporal rule-based feature extraction system and method may be practiced. It is to be understood that other embodiments may be utilized and structural changes may be made without departing from the scope of the claimed subject matter.

I. Terminology

Before discussing an overview and the details of embodiments of the temporal rule-based feature extraction system and method, a terminology foundation will be set. Specifically, a trace t is defined as a sequence of events. An event type ô is a set of positions (names or fields). An event of type ô is a set of equality constraints relating all positions of ô to an atomic value. An atomic value is one that is not further divisible by any other value. In every event type, a set of positions are identified as a primary. Every non-empty subset of an event containing at least one equality constraint involving a primary position is designated as an abstraction of the event.

An abstraction with equality constraints that involve variables (instead of values) and a mapping from variables to values is called a quantified abstraction. An abstraction without variables is known as an unquantified abstraction. In this document it is assumed that there exists a general technique to generate abstractions of events and relate such abstractions by considering valuation mappings.

Between every two distinct events in a trace, embodiments of the temporal rule-based feature extraction system and method recognize two temporal orders captured by the operators. The first temporal order is ($\xrightarrow{*}$), which means "followed by." The second temporal order is ($\xleftarrow{*}$), which means "preceded by." In these operators, the first event is the trigger event and the second event is the effect event. Further, embodiments of the temporal rule-based feature extraction system and method also recognize a refinement of these operators that prohibits the recurrence of the trigger event between the trigger event and the effect event. These are essentially the operators supported by the database query language query by example in C (QBEC). Based on the relation between events and abstractions, the ordering and operators are applicable to abstractions as well.

A temporal ordering between abstractions is a sequence of abstraction with each consecutive pair of abstraction being related by a temporal operator. Orderings admit a grouping operator ( ) to indicate precedence of a sub-ordering over another sub-ordering. For example, the A $\xleftarrow{*}$ (B $\xrightarrow{*}$ C). Every ordering o is associated with a set of abstraction positions Pos(o) that is the index of the abstractions in o.

The support for an abstraction is the total number of events in the given trace set that are supersets of the abstraction. A subsequence of a trace is a witness to an ordering if the following are true. First, every event in the subsequence is represented by an abstraction in the ordering. Second, the order of the events in the sequence is identical to the order between the corresponding abstractions in the ordering. The support S(o) for an ordering o is the number of witnesses to the ordering in the given trace set. The confidence C(o) for an ordering is the ratio of the support for the ordering and the support for the trigger event of the ordering.

A trace t satisfies a rule r, if it contains a witness to the corresponding ordering. A set of rules satisfied by a trace t is denoted as R(t). Similarly, a set of rules satisfied by a trace set T is denoted as R(T). A temporal ordering with a witness is a temporal rule r. Given a support threshold S and confidence threshold C, an ordering with support equal to or greater than S is known as a candidate rule. A candidate rule with confidence equal to or greater than C is known as a significant rule.

II. System Overview

FIG. 1 is a block diagram illustrating a general overview of embodiments of the temporal rule-based feature extraction system 100 and method implemented on a computing device 110 and in a computing environment. Note that FIG. 1 is merely one way in which embodiments of the embodiments of the temporal rule-based feature extraction system 100 and method may be implemented, and is shown merely for illustrative purposes. It should be noted that there are several other ways in which embodiments of the temporal rule-based feature extraction system 100 and method may be implemented, which will be apparent to those having ordinary skill in the art.

In general, embodiments of the temporal rule-based feature extraction system 100 and method extract features from temporal-based rules satisfied by a trace. This is performed by first defining features and then generating similarity measures to compute a similarity between traces. This similarity then is used to process and characterize the trace.

As shown in FIG. 1, embodiments of the temporal rule-based feature extraction system 100 and method are disposed on the computing device 110. The input to embodiments of the temporal rule-based feature extraction system 100 are a trace 115 and a set of temporal-based rules that are satisfied by the trace 120. Output of embodiments of the temporal rule-based feature extraction system 100 are extracted features based on the temporal rules 125.

Embodiments of the temporal rule-based feature extraction system 100 include a feature definition module 130, which define features based on the set of temporal-based rules that are satisfied by the trace 120. In addition, embodiments of the temporal rule-based feature extraction system 100 include a similarity measure module 135, which generate a similarity measure for the defined features, and a comparison module 140, which use the defined features and similarity measures and use them to process and characterize traces. The comparison module 140 solves feature extraction problems by using the temporal rule-based feature and the corresponding similarity measure to compare traces.

The feature definition module 130 includes an extrinsic feature module 145, which defines features using extrinsic properties of the temporal-based rules, and an intrinsic feature module 150, which defines features using intrinsic properties of the temporal-based rules. The extrinsic feature module 145 generates a rule set feature 155, which is based on using one rule or a set of rules as a feature, and a rule frequency feature 160, which is based on how often a particular rule is satisfied by a trace. The intrinsic feature module 150 generates a distance feature 165, which is based on a mapping of distances between abstraction position pairs, and a distance frequency feature 170, which is based on a mapping of witness distance to a normalized frequency.

The similarity measure module 135 includes a rule set based similarity measure module 175, a rule frequency based similarity measure module 180, a distance based similarity measure module 185, and a distance frequency based similarity measure module 190. The rule set based similarity measure module 175 generates a similarity measure for the rule set feature 155, the rule frequency based similarity measure module 180 generates a similarity measure for the rule frequency feature 160, the distance based similarity measure module 185 generates a similarity measure for the distance feature 165, and the distance frequency based similarity measure module 190 generates a similarity measure for the distance frequency feature 170. The defined features and similarity measures then are used by the comparison module 140 to compare, characterize, and otherwise process traces.

III. Operational Overview

Figure 2:
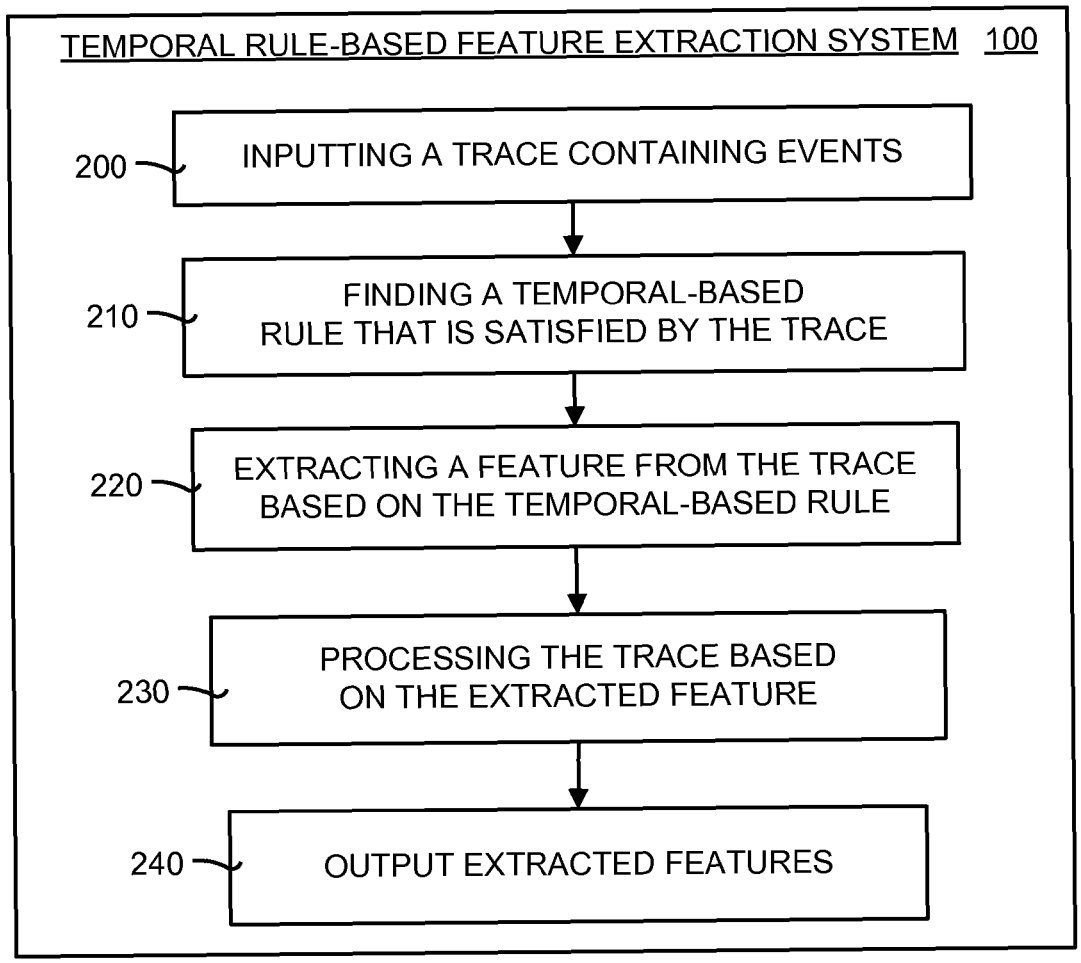
FIG. 2 is a flow diagram illustrating the general operation of embodiments of the temporal rule-based feature extraction system and method shown in FIG. 1.

FIG. 2 is a flow diagram illustrating the general operation of embodiments of the temporal rule-based feature extraction system 100 and method shown in FIG. 1. In general, embodiments of the temporal rule-based feature extraction system 100 and method define and extract features using temporal-based rules satisfied by a trace. Referring to FIG. 2, the method begins by inputting a trace containing events (box 200). Next, embodiments of the temporal rule-based feature extraction method find a temporal-based rule that is satisfied by the trace (box 210).

Next, a feature is extracted from the trace based on the temporal-based rule (box 220). This extracted feature then is used to process the trace (box 230). As noted above and below, this processing can include classifying, clustering, and fingerprinting the trace. The extracted features based on the temporal-based rule then is output from embodiments of the temporal rule-based feature extraction method (box 240).

IV. Operational Details

The operational details of embodiments of the temporal rule-based feature extraction system 100 and method now will be discussed. These embodiments include embodiments of the feature definition module 130, the rule set based similarity measure module 175, the rule frequency based similarity measure module 180, the distance based similarity measure module 185, and the distance frequency based similarity measure module 190. The operational details of each of these modules now will be discussed in detail.

IV.A. Feature Definition Module

Figure 3:
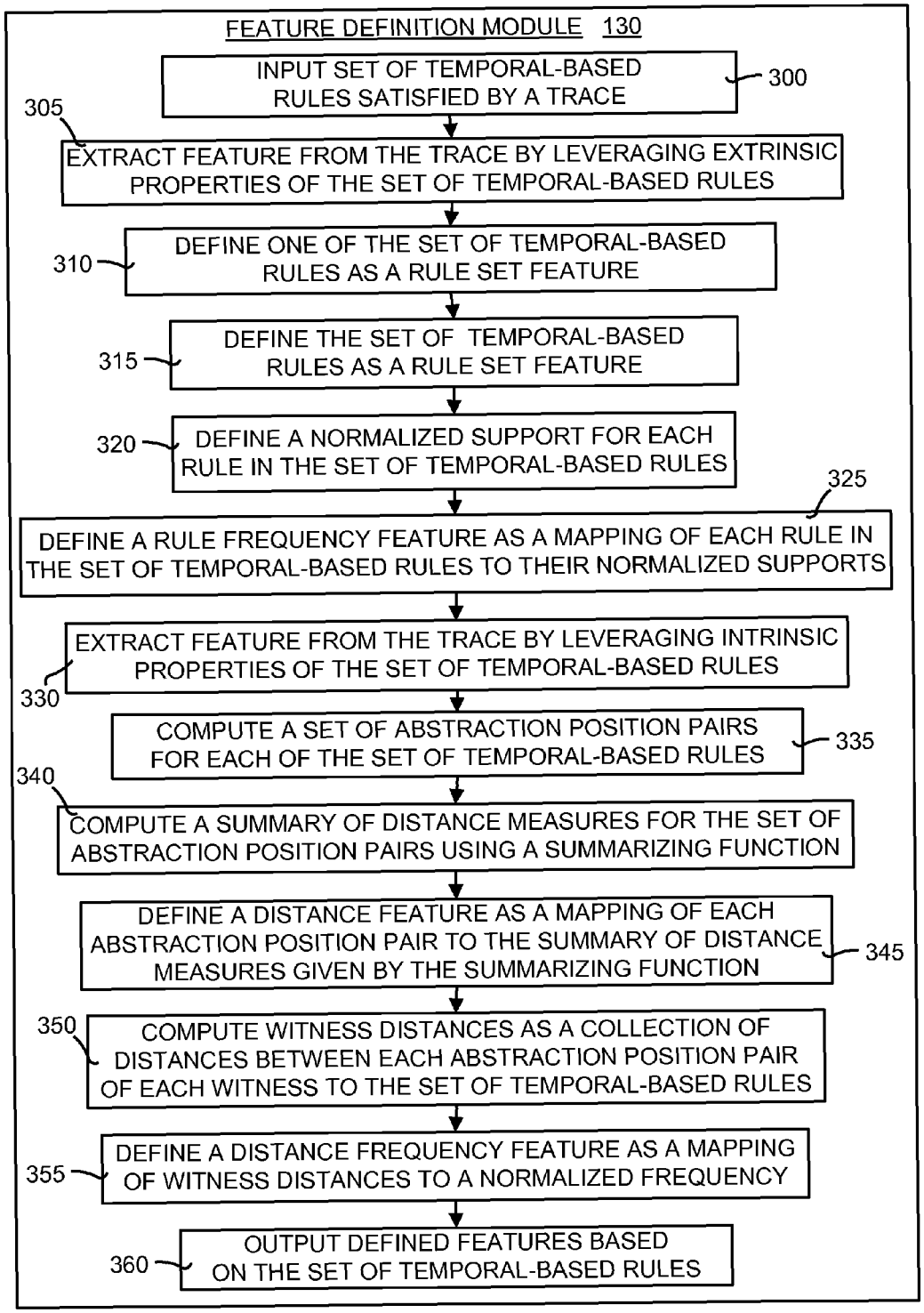
FIG. 3 is a flow diagram illustrating the operational details of embodiments of the feature definition module shown in FIG. 1.

The feature definition module 130 defines features based on the temporal-based rules satisfied by the trace. FIG. 3 is a flow diagram illustrating the operational details of embodiments of the feature definition module 130 shown in FIG. 1. The operation of embodiments of the feature definition module 130 begins by inputting a set of temporal-based rules satisfied by a trace (box 300). Features then are extracted from the trace either by using extrinsic properties of the rules, intrinsic properties of the rules, or both.

In particular, embodiments of the feature definition module 130 extract features from the trace by leveraging extrinsic properties of the set of temporal-based rules (box 305). Next, one rule in the set of temporal-based rules is defined as a rule set feature (box 310). This means that the temporal-based rule itself is defined as a feature. In addition to a single rule being defined as a feature, the entire set of temporal-based rule may also be defined as a feature (box 315).

Embodiments of the feature definition module 130 then define a normalized support for each rule in the set of temporal-based rules (box 320). A rule frequency feature can be defined as a mapping of each rule in the set of temporal-based rules to their normalized supports (box 325).

Embodiments of the feature definition module 130 also extract features from the trace by leveraging intrinsic properties of the set of temporal-based rules (box 330). A set of abstraction position pairs then is computed for each rule in the set of temporal-based rules (box 335). Next, a summary of distance measures for the set of abstraction position pairs is computed using a summarizing function (box 340). A distance feature is defined by embodiments of the feature definition module 130 as a mapping of each abstraction position pair to the summary of distance measures given by the summarizing function (box 345).

A distance frequency feature is defined by embodiments of the feature definition module 130 as follows. Witness distances are computed as a collection of distances between each abstraction position pair of each witness to the set of temporal-based rules (box 350). Next, embodiments of the feature definition module 130 define the distance frequency feature as a mapping of witness distances to a normalized frequency (box 355). The output of embodiments of the feature definition module 130 are the defined features based on the set of temporal-based rules (box 360). These defined features include the rule set feature 155, the rule frequency feature 160, the distance feature 165, and the distance frequency feature 170.

IV.A.i. Extrinsic Feature Module

The extrinsic feature module 145 extracts features from the rules satisfied by the trace 115. In general, this is performed by leveraging the extrinsic properties of rules. As noted above, extrinsic properties of rules are those properties that are independent of the internal structure of the rules.

IV.A.i.a. Rule Set Feature

One of the defined features based on the set of temporal-based rules satisfied by the trace 120 is the rule set feature 155. Embodiments of the extrinsic feature module 145 include the rule set feature 155. By construction, a sequence implicitly imposes an ordering between its elements. Therefore, these orderings can be perceived as describing the sequence and be considered as features of the sequence. Rules capturing the orderings between events of a trace can be considered as nominal features of the trace. Similarly, a set of rules can be considered as a feature as well.

Mathematically, the rule set feature $\aleph R$ (t) of t satisfying R(t) is R(t).

IV.A.i.b. Rule Frequency Feature

Another one of the defined features based on the set of temporal-based rules satisfied by the trace 120 is the rule frequency feature 160. Embodiments of the extrinsic feature module 145 include the rule frequency feature 160. For a given system, it is possible for two traces to satisfy the same set of rules while still capturing different behavior of the system. For example, an application that reads a database might do so with few failures in a good execution and with numerous failures in a bad execution. If the application programming interfaces (APIs) used in the application are traced, then traces of the above executions will satisfy the same set of rules about the ordering of APIs. However, the support for these rules in these traces will be different. Specifically, the trace of the good execution will have lower support for rules involving the database access API in comparison with the trace of the bad execution. In such cases, the support for the rules satisfied by a trace can be used as a feature of the trace.

While two traces capture the same behavior and satisfy the same set of rules, the support for the rules can be significantly different, depending on the length of the trace. Hence, the absolute rule support as a feature is too brittle in the context of comparative analysis. This shortcoming can be addressed by using the normalized support for the rules satisfied by a trace as ordinal feature of the trace.

Mathematically, given a set of rules $R(t)$ for trace t, the normalized support $\bar{s}(r)$ for a rule r is defined as, $$s(r)/\Sigma_{r_i \in R}(t) s(r_i),$$

and the rule frequency feature 160, $$\aleph_{\bar{s}}(t, R(t))$$

is defined as the mapping of all rules in $R(t)$ to their normalized supports in t. In other words, $$\{(r, \bar{s}(r)) | r \in R(t)\}.$$

Under a unique ordering of rules, the normalized frequency distribution of rules satisfied by a trace can also be used as a feature of the trace. Also, it should be noted that, $\aleph_{\bar{s}}$ can be perceived as a random variable defined as the rules that describes some behavior. In addition, the normalized support can be perceived as the probability of the variable evaluating to any of the rule.

IV.B.i. Intrinsic Feature Module

The intrinsic feature module 150 extracts features from the set of temporal-based rules satisfied by the trace 120 by leveraging the intrinsic properties of rules. As noted above, intrinsic properties are those properties that are dependent of the internal structure of the rules.

IV.B.i.a. Distance Feature

Another one of the defined features based on the set of temporal-based rules satisfied by the trace 120 is the distance feature 165. Embodiments of the intrinsic feature module 150 include the distance feature 165. Every temporal rule has an intrinsic property based on the involved events. In every witness to a rule, every pair of distinct events can be associated with distance measure.

Specifically, given a witness to a temporal rule in a trace, embodiments of the intrinsic feature module 150 measure the distance between any two events in the witness in terms of either elapsed time or intervening events. Thus, for every pair of abstraction positions of a rule, embodiments of the intrinsic feature module 150 collect the distance measures from each witness to the rule and calculate various summary statistics (such as Tukey's five numbers) of these measures. In different embodiments, various summary statistics of distance measures can be used as features of the corresponding rule. Consequently, these summary statistics can also be used as features of a satisfying trace. Depending on how the witness to a rule is constructed, distance can be sensitive to the length of the trace. To alleviate this issue, eager approaches can be used to construct the witnesses.

Mathematically, given a rule r, $P(r)$ is the set of all pairs (i, j) of abstraction positions of r such that i<j. Given a trace t that satisfies r, $\varsigma(p, r, t)$ is the summary of distance measures for, $$p \in P(r)$$

in t where $\varsigma$ is a summarizing function. The distance feature, $$\aleph_\eta(t, r)$$

of trace t satisfying rule r is defined as the mapping of all abstraction position pairs of r to their distance summary in t as provided by $\varsigma$. This can be represented by the equation, $$\{(p, \eta(p, r, t)) | p \in P(r)\}.$$

IV.B.i.b. Distance Frequency Feature

Another one of the defined features based on the set of temporal-based rules satisfied by the trace 120 is the distance frequency feature 170. Embodiments of the intrinsic feature module 150 also include the distance frequency feature 170. For a rule, each abstraction position pair can be associated with the frequency distribution of the distances between the abstraction positions in the witnesses to the rule. From this, embodiments of the intrinsic feature module 150 construct a feature that is similar to rule frequency feature.

Mathematically, given an abstraction position pair $p=(i, j)$ of rule r satisfied by a trace t, the witness distances of p (denoted as $\ddot{A}(p, r, t)$) is the collection of distances between the $i^{th}$ and $j^{th}$ abstractions of all witnesses to r in t. The distance frequency feature 170, $$\aleph_N(t, r, p)$$

of trace t satisfying rule r with position pair p is the mapping of witness distances of p to their normalized frequency. In other words, $$\{(\delta, \bar{N}(\delta)) | \delta \in \Delta(p, r, t)\},$$

where $$\bar{N}(\delta) = N(\delta) / |\Delta(p, r, t)|$$

and $N(\delta)$ is the frequency of $\delta$ in $\ddot{A}(p, r, t)$. As in the case of the rule frequency feature, the normalized frequency distribution of the distances for an abstraction position pair of a rule can be used as a feature of the rule. Consequently, it can be used a feature of the trace.

IV.B. Similarity Measure Module

Embodiments of the similarity measure module 135 use a variety of similarity measures based on the features described above. Each of the modules that produce these similarity measures now will be discussed.

IV.B.i. Rule Set Based Similarity Measure Module

Figure 4:
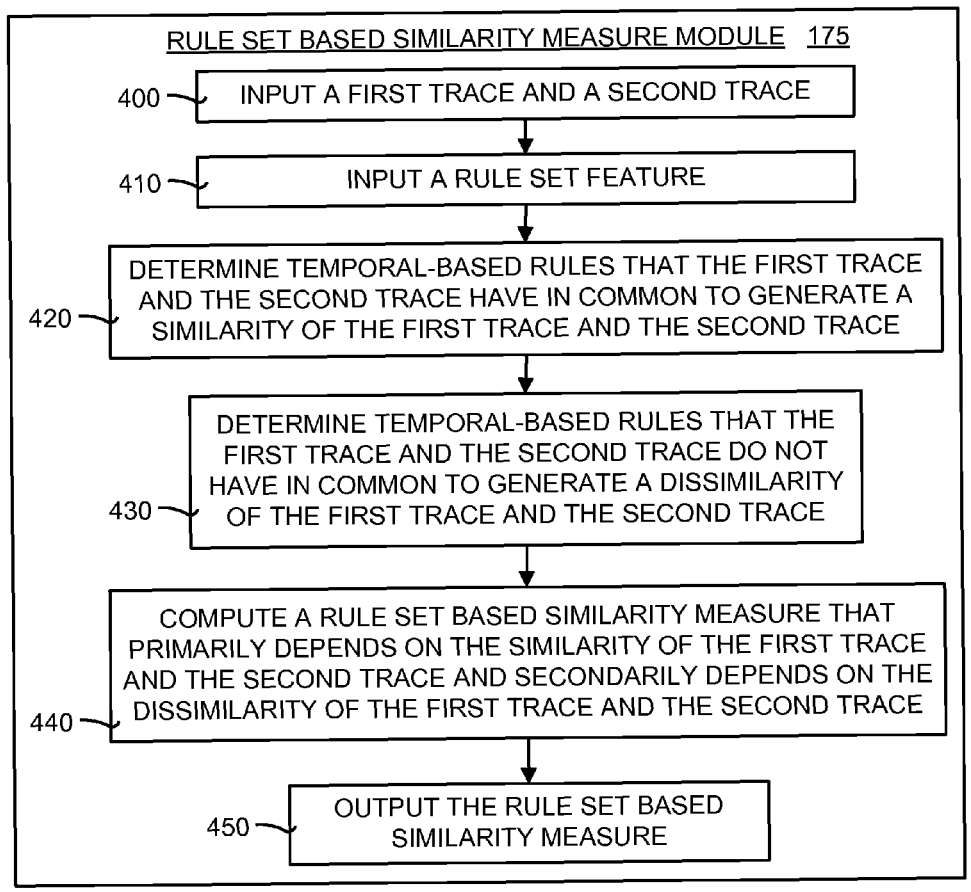
FIG. 4 is a flow diagram illustrating the operational details of embodiments of the rule set based similarity measure module shown in FIG. 1.

Embodiments of the rule set based similarity measure module 175 determine how similar two traces are based on the rule set feature 155. FIG. 4 is a flow diagram illustrating the operational details of embodiments of the rule set based similarity measure module 175 shown in FIG. 1. The operation begins by inputting a first trace and a second trace (box 400). In addition, a rule set feature 155 also is input (box 410).

Embodiments of the rule set based similarity measure module 175 then determine temporal-based rules that the first trace and the second trace have in common (box 420). This generates a similarity of the first trace and the second trace. In addition, embodiments of the rule set based similarity measure module 175 also determine temporal-based rules that the first trace and the second trace do not have in common (box 430). This generates a dissimilarity of the first trace and the second trace. A rule set based similarity measure then is computed that primarily depends on the similarity of the first trace and the second trace and secondarily depends on the dissimilarity of the first trace and the second trace (box 440). The output of embodiments of the rule set based similarity measure module 175 is the rule set based similarity measure (box 450).

Mathematically, let $R(t_1)$ and $R(t_2)$ the sets of rules satisfied by traces $t_1$ and $t_2$, respectively. The set of rules $R(t_1) \cap R(t_2)$ satisfied by both traces indicate the similarity between the traces and the number of such commonly satisfied rules is a measure of similarity.

By combining the rules from both sets and the rules common to both sets, an equation describing this similarity measure can be defined as:

$$d(t_1, t_2) = 1 - \frac{|R(t_1) \cap R(t_2)|}{|R(t_1) \cup R(t_2)|}. \quad (1)$$

The above measure is undefined if the rule sets are empty. However, the measure can be extended to be zero when the rule sets for the traces are empty.

As $\aleph R(t) = R(t)$, Equation (1) above can be rewritten as:

$$d(t_1, t_2) = 1 - \frac{|\aleph_R(t_1) \cap \aleph_R(t_2)|}{|\aleph_R(t_1) \cup \aleph_R(t_2)|}. \quad (2)$$

IV.B.ii. Rule Frequency Based Similarity Measure Module

Embodiments of the rule frequency based similarity measure module 180 determine how similar two traces are based on the rule frequency feature 160. It is possible for two different traces to be deemed as similar by embodiments of the rule set based similarity measure module 175. For example, consider an application that accesses a database over the network. The behavior of this application when the network connectivity is bad will differ from the behavior of the same application when the network connectivity is good. Specifically, the application may retry to establish connection to the database in the former case. Hence, the frequency of events that occur in both situations will differ in each situation.

Figure 5:
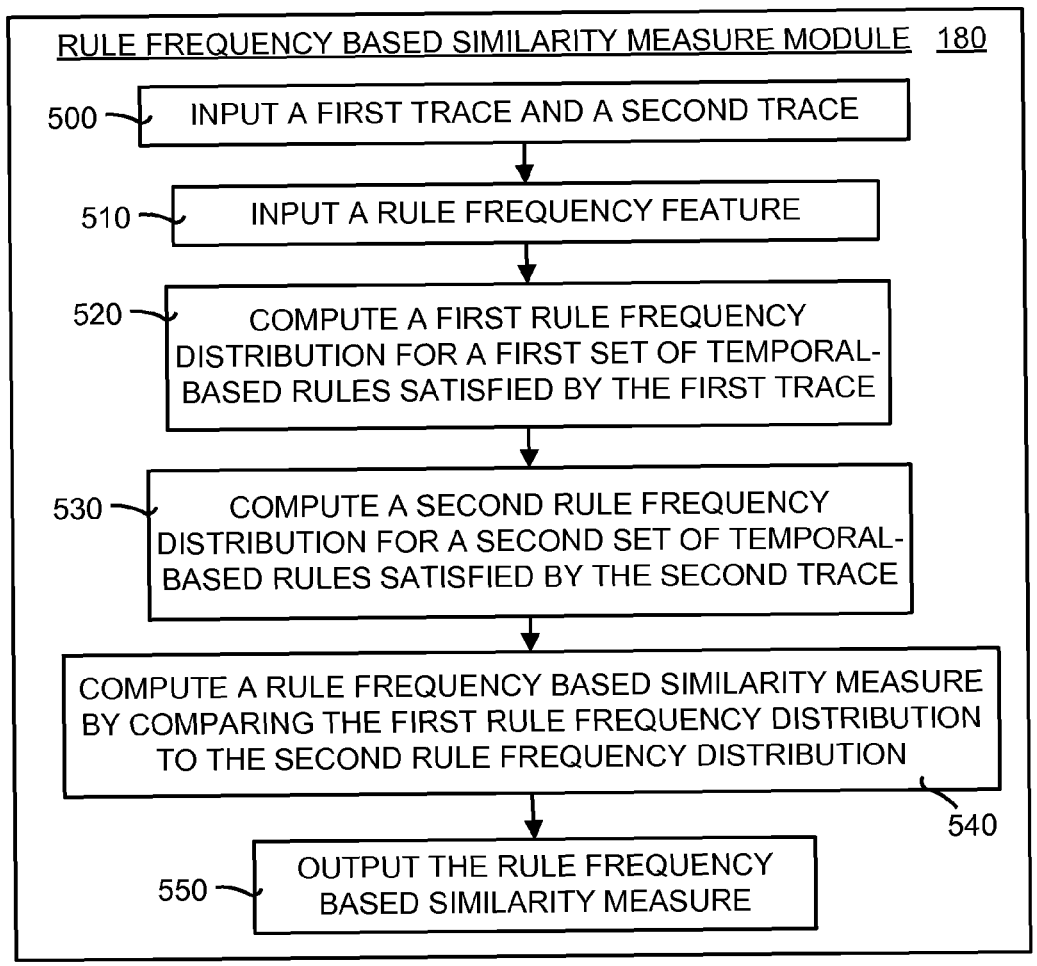
FIG. 5 is a flow diagram illustrating the operational details of embodiments of the rule frequency based similarity measure module shown in FIG. 1.

FIG. 5 is a flow diagram illustrating the operational details of embodiments of the rule frequency based similarity measure module 180 shown in FIG. 1. The operation begins by inputting a first trace and a second trace (box 500). In addition, the rule frequency feature 160 is input (box 510). Next, embodiments of the rule frequency based similarity measure module 180 compute a first rule frequency distribution for a first set of temporal-based rules satisfied by the first trace (box 520). Embodiments of the rule frequency based similarity measure module 180 also compute a second rule frequency distribution for a second set of temporal-based rules satisfied by the second trace (box 530).

Embodiments of the rule frequency based similarity measure module 180 then compute a rule frequency based similarity measure (box 540). This is performed by comparing the first rule frequency distribution to the second rule frequency distribution. In some embodiments of the rule frequency based similarity measure module 180 the distributions are represented by a histogram. The output of embodiments of the rule frequency based similarity measure module 180 is the rule frequency based similarity measure (box 550).

Mathematically, embodiments of the rule frequency based similarity measure module 180 define $t_1$ and $t_2$ as two traces with, $\aleph_{\bar{s}}(t_1, Q)$ and $\aleph_{\bar{s}}(t_2, Q)$ rule frequency features, respectively, where Q is a set of rules satisfied by both $t_1$ and $t_2$. Embodiments of the rule frequency based similarity measure module 180 define the similarity measure as follows:

$$d(t_1, t_2, Q) = \sum_{r \in Q} (\aleph_s(t_1, Q)(r) - \aleph_s(t_2, Q)(r))^2. \quad (3)$$

It should be noted that alternatively the confidence of each rule r from Q in a trace t could be used instead of, $\aleph_{\bar{s}}(t, Q)(r)$, to define the similarity measure. However, it is unclear how this similarity measure compares to the similarity measure defined in Equation (3) in terms of effectiveness. For example, in the above example scenario, it is possible that rules related database events will have high and similar confidence in both cases but the same rules will most likely differ in terms of support.

IV.B.iii. Distance Based Similarity Measure Module

Embodiments of the distance based similarity measure module 185 determine how similar two traces are based on the distance feature 165. It is possible for two different traces to be deemed as similar by embodiments of the rule frequency based similarity measure module 180. For example, consider an application that accesses a database over the network. The behavior of this application in terms of the time duration between various database accessing actions and events is dependent on network latency. Thus, the application will observe larger latency under heavy network loads and consequently the time duration between various actions and events will be larger in such conditions.

Figure 6:
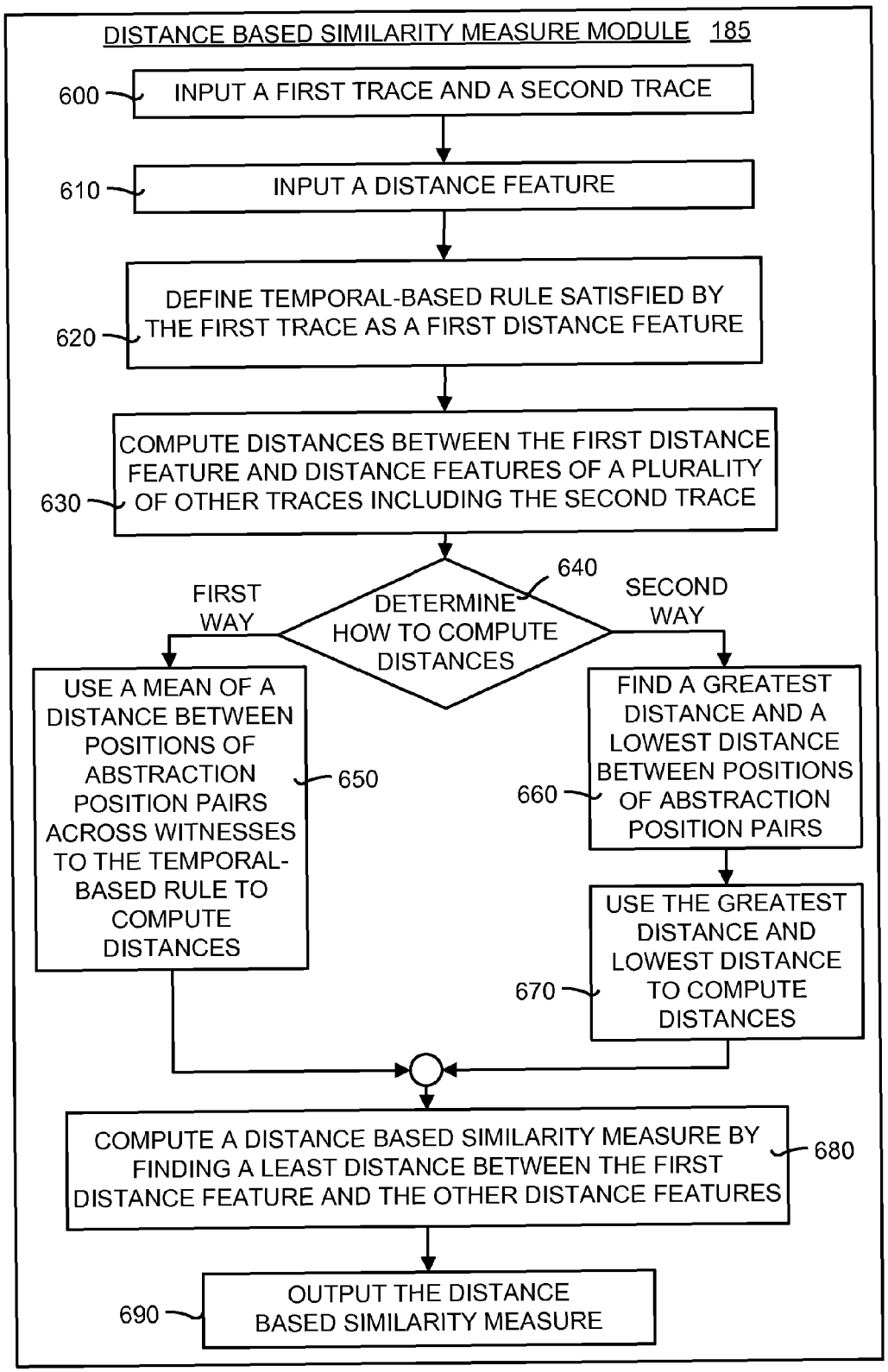
FIG. 6 is a flow diagram illustrating the operational details of embodiments of the distance based similarity measure module shown in FIG. 1.

FIG. 6 is a flow diagram illustrating the operational details of embodiments of the distance based similarity measure module 185 shown in FIG. 1. The operation begins by inputting a first trace and a second trace (box 600). In addition, the distance feature 165 is input (box 610).

Embodiments of the distance based similarity measure module 185 then define a temporal-based rule satisfied by the first trace as a first distance feature (box 620). In addition, distances between the first distance feature and distance features of a plurality of other traces are computed (box 630). The plurality of other traces also includes the second trace.

A determination then is made as to how the distance will be computed (box 640). A first way to compute distances is to use a mean of a distance between positions of abstraction position pairs across witnesses to the temporal-based rule (box 650). A second way to compute distances is to first find a greatest distance and a lowest distance between positions of the abstraction position pairs (box 660). Next, embodiments of the distance based similarity measure module 185 use the greatest distance and the lowest distance to compute the distances between the first distance feature and the distance features of the plurality of other traces (box 670).

Embodiments of the distance based similarity measure module 185 then compute a distance based similarity measure (box 680). This is achieved by finding a least distance between the first distance feature and the other distance features. The output from embodiments of the distance based similarity measure module 185 is the distance based similarity measure (box 690).

Mathematically, embodiments of the distance based similarity measure module 185 define $t_1$ and $t_2$ as two traces with, $$\aleph_\eta(t_1,r) \text{ and } \aleph_\eta(t_2,r),$$

distance features, respectively. Note that r is a rule satisfied by both $t_1$ and $t_2$. Embodiments of the distance based similarity measure module 185 define the similarity measure as follows:

$$d(t_1, t_2, r) = \sum_{p \in P(r)} (\aleph_\eta(t_1, r)(p) - \aleph_\eta(t_2, r)(p))^2. \quad (4)$$

The effectiveness of this similarity measure depends on the choice of summary statistics provided by ç. For example, suppose ç provides the mean of the distance between positions of an abstraction position pair across all witnesses to the rule. While mean can be sensitive to outliers occurring at one end of the distribution, it can also be insensitive to outliers when they occur at both ends of the distribution. Thus, the similarity measure of Equation (4) can be ineffective. On the other hand, the width of the interval defined by the lowest and highest distance between positions of an abstraction position pair is sensitive to outliers. Thus, it can be used as an alternative summary statistics.

IV.B.iv. Distance Frequency Based Similarity Measure Module

Embodiments of the distance frequency based similarity measure module 190 determine how similar two traces are based on the distance frequency feature 170. Similar to embodiments of the rule frequency based similarity measure module 180, embodiments of the distance frequency based similarity measure module 190 leverage the normalized frequency of various distances between positions of an abstraction position pair as exhibited in various witnesses to a rule to define a distance frequency based similarity measure.

Figure 7:
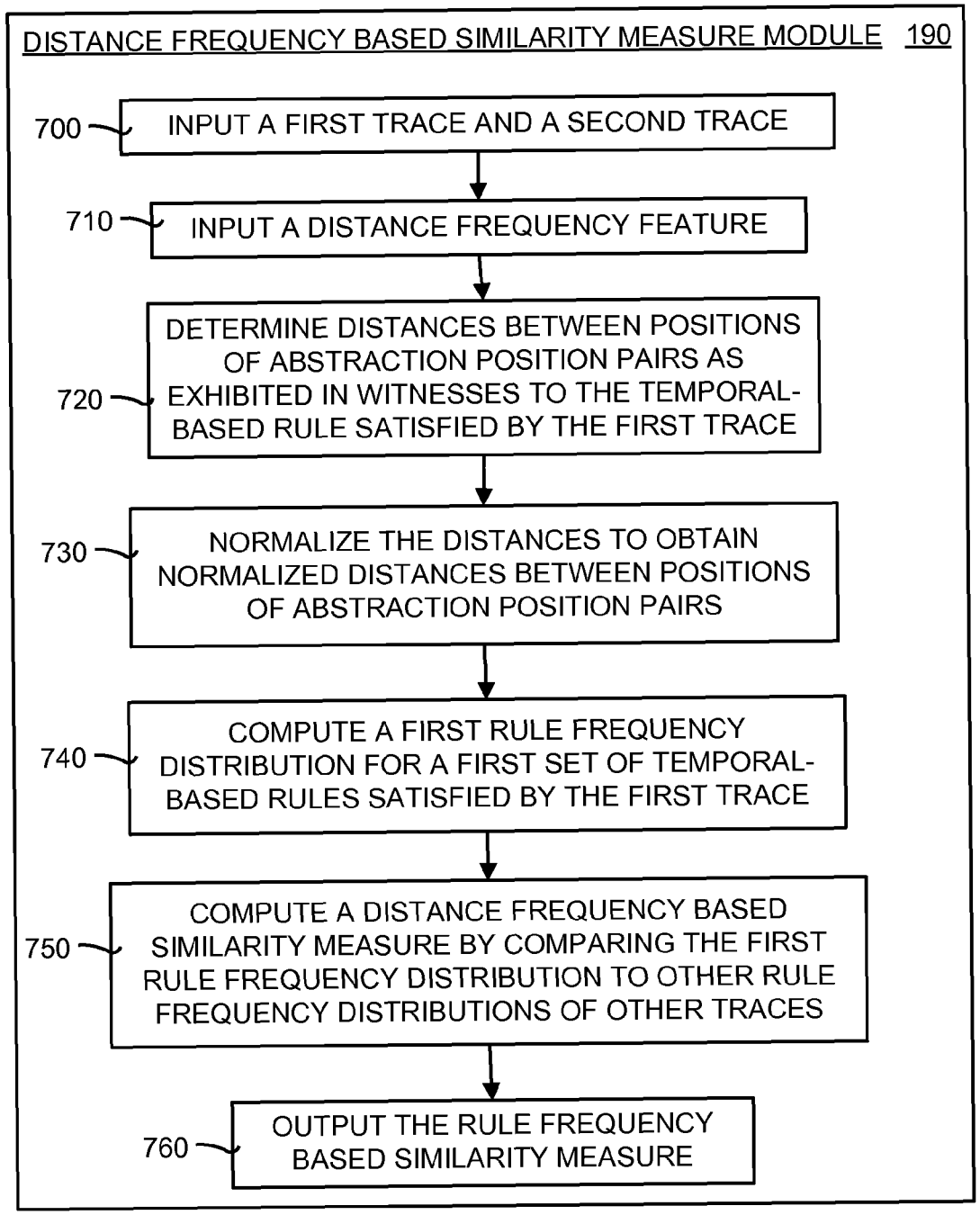
FIG. 7 is a flow diagram illustrating the operational details of embodiments of the distance frequency similarity measure module shown in FIG. 1.

FIG. 7 is a flow diagram illustrating the operational details of embodiments of the distance frequency similarity measure module 190 shown in FIG. 1. Embodiments of the distance frequency similarity measure module 190 input a first trace and a second trace (box 700), and also input the distance frequency feature 170 (box 710). Next, distances between positions of abstraction position pairs as exhibited in witnesses to the temporal-based rule satisfied by the first trace are determined (box 720).

Embodiments of the distance frequency similarity measure module 190 the normalize the distances to obtain normalized distances between positions of the abstraction position pairs (box 730). Next, a first rule frequency distribution is computed for a first set of temporal-based rules satisfied by the first trace (box 740). Embodiments of the distance frequency similarity measure module 190 then compute the distance frequency based similarity measure by comparing the first rule frequency distribution to other rule frequency distributions of other traces (box 750). The output from embodiments of the distance frequency similarity measure module 190 is the rule frequency based similarity measure (box 760).

Mathematically, embodiments of the distance frequency based similarity measure module 190 define $t_1$ and $t_2$ as two traces with, $$\aleph_\eta(t_1,r,p) \text{ and } \aleph_N(t_2,r,p),$$

distance frequency features, respectively. Note that r is a rule satisfied by both $t_1$ and $t_2$ and p is a abstraction position pair of r. Embodiments of the distance frequency based similarity measure module 190 define the distance frequency based similarity measure as follows:

$$d(t_1, t_2, r) = \sum_{p \in P(r)} \sum_{i \in I_p} (\aleph_N(t_1, r, p) \perp (i) - \aleph_N(t_2, r, p) \perp (i))^2, \quad (5)$$

where, $$I_p = dom(\aleph_N(t_1, r, p)) \cup dom(\aleph_N(t_2, r, p)) \text{ and,}$$

$$\aleph_N(t, r, p) \perp (x) = \begin{cases} \aleph_N(t, r, p)(x) & : \; x \in dom(\aleph_N(t, r, p)) \\ 0 & : \; \text{otherwise.} \end{cases}$$

V. Applications

Embodiments of the temporal rule-based feature extraction system 100 and method extract features that can be used to classify, cluster, and fingerprint traces. In addition, the features extracted by embodiments of the temporal rule-based feature extraction system 100 and method can be used to identify differences between two traces. The details of how the extracted features are used to solve these problems will be discussed in detail.

V.A. Clustering Problem

Embodiments of the temporal rule-based feature extraction system 100 and method can address the problem of given a set of traces, create clusters of traces that capture the same behavior. Under the assumption that the temporal rules satisfied by a trace can be used either directly or indirectly (as features) to capture the behavior of a system captured in the trace, embodiments of the temporal rule-based feature extraction system 100 and method are used to extract features of traces, define a distance metric based on the extracted feature, and use it with existing clustering algorithms to cluster traces.

For example, a divisive clustering algorithm can be trivially adapted to use the rules satisfied by a trace as a feature. Specifically, rules can be mined from the given trace set and then used to iteratively partition the trace set based on the rules satisfied by a trace. In alternate embodiments, the trace set can be partitioned based on trace specific support for a rule. In each iteration, the rule can be chosen in the decreasing order of the support of the rules. In alternate embodiments, rules can be chosen in the order of the number of traces satisfying the rules.

To admit local changes in each partition, embodiments of the temporal rule-based feature extraction system 100 and method apply the algorithm to each trace partition separately by mining the rules for each partition and using them to create a sub-partition. Similarly, embodiments of the temporal rule-based feature extraction system 100 and method can devise rule-based agglomerative clustering algorithms.

Embodiments of the temporal rule-based feature extraction system 100 and method use the above strategies either alone or in any combination. In other words, different features may be used in different iterations such that any one or a combination of the four features extracted by embodiments of the system 100 and method can be used in these algorithms.

V.B. Classification Problem

Embodiments of the temporal rule-based feature extraction system 100 and method can address the problem that from a set of trace sets (or classes) such that all traces in a trace set capture the same behavior of the system, identify a trace set (if one exists) that captures the same behavior as a given trace.

One solution that embodiments of the temporal rule-based feature extraction system 100 and method use is to mine rules from the given trace and then use any of the features described above to define a distance metric to identify the closest trace set (or class). One trivial solution is to collapse the trace sets into a single set, add the given trace to this set, and cluster the traces in this set using techniques set forth above. Using this solution means that clustering will result in the same initial trace sets, with the exception of one trace set containing an additional element. Further, it will most likely be inefficient due to repetition of redundant classifications.

When comparing traces using the rules they satisfy, it is most likely that that rules may be similar but not identical. For example, the arguments to the same set of functions in call traces will be different. If such arguments are data bits owing between functions, then quantified rules will enforce identicalness. On the other hand, if the arguments are context-specific (such as a location of a configuration file, a non-zero value to indicate success), then some elements of the abstractions involved in a rule are dropped to establish similarity between rules. Embodiments of the temporal rule-based feature extraction system 100 and method considered rules to be similar if the difference in abstractions at the corresponding non-primary positions was no more than a given threshold.

V.C. Fingerprinting Problem

A fingerprint of an object or of data is a comparatively small piece of data that can uniquely identify the original object or data. Trivially, a subset of features of an object or data can be perceived as a fingerprint of the object or data. Hence, there can be numerous fingerprints for an object. Applications often are interested in only certain aspects of objects. Consequently, only fingerprints that help identify and distinguish objects along such aspects are relevant.

A trace captures the behavior of a system as observed or exhibited in terms of an specific alphabet (such as APIs and logging or tracing statements). Hence, a fingerprint of a trace can be perceived as representing the behavior of a system as captured in the trace. So, a fingerprint can be perceived as a signature of a specific behavior of the system.

Embodiments of the temporal rule-based feature extraction system 100 and method can address the problem that given a trace, generate a (behavioral) fingerprint of the trace based on the behavior of the system captured by the trace. Since temporal rules abstract the behavior of the system captured by the trace, these rules can be used to extract features of a trace. Consequently, a collection of features extracted from the temporal rules satisfied by a trace can be used as a fingerprint of the trace.

Such fingerprint can be softened (against outliers) by considering a subset of the rules. Of course, this will raise the issue of how to identify such a subset. Similarly, collections of other features extracted from temporal rules satisfied by a trace can be used as fingerprints of a trace.

V.D. Trace Diffing Problem

Embodiments of the temporal rule-based feature extraction system 100 and method can address the problem of identifying differences between two traces. In particular, given two traces, $t_1$ and $t_2$, along with the sets of rules satisfied by these traces, embodiments of the temporal rule-based feature extraction system and method can leverage the above defined features and measures to help identify the differences between the traces.

First, for every rule that is not satisfied by a trace, the occurrences (if any) of the trigger event of the rule can be considered as the differences between the traces with respect to the rule. As every occurrence of the trigger event qualifies as a difference, such differences could be overwhelming when the frequency of the triggering event in the trace is high.

Second, let Q be the set of rules satisfied by traces, $t_1$ and $t_2$. For every rule, $$r \in Q,$$

then, $$(\aleph_{\bar{s}}(t_1,Q)(r) - \aleph_{\bar{s}}(t_2,Q)(r))^2$$

can be used to rank the rules in terms of the extent of deviation between traces as captured by a rule. With such ranking, a user can sift through the differences pertaining to the rules in order of the rank of the rules.

Third, let r be a rule that is satisfied by traces, $t_1$ and $t_2$. Then, $$(\aleph_\eta(t_1,r)(p) - \aleph_\eta(t_2,r)(p))^2$$

can be used to rank the position pairs in the rule in terms of extent of deviation between traces as captured by a rule. This differentiating aspect can be used to merely suggest that the user should focus her attention on a specific position pair of witnesses to the rule while trying to identify the difference.

Fourth, let p be an abstraction position pair in a rule r satisfied by traces, $t_1$ and $t_2$. Let $E_p$ be the set of all distances in, $$dom(\Delta(t_1,r,p))$$

that differ in terms of frequency in traces, $t_1$ and $t_2$. Now, every witness with distances from $E_p$ for p describes a difference between the traces, $t_1$ and $t_2$.

VI. Exemplary Operating Environment

Embodiments of the temporal rule-based feature extraction system 100 and method are designed to operate in a computing environment. The following discussion is intended to provide a brief, general description of a suitable computing environment in which embodiments of the temporal rule-based feature extraction system 100 and method may be implemented.

Figure 8:
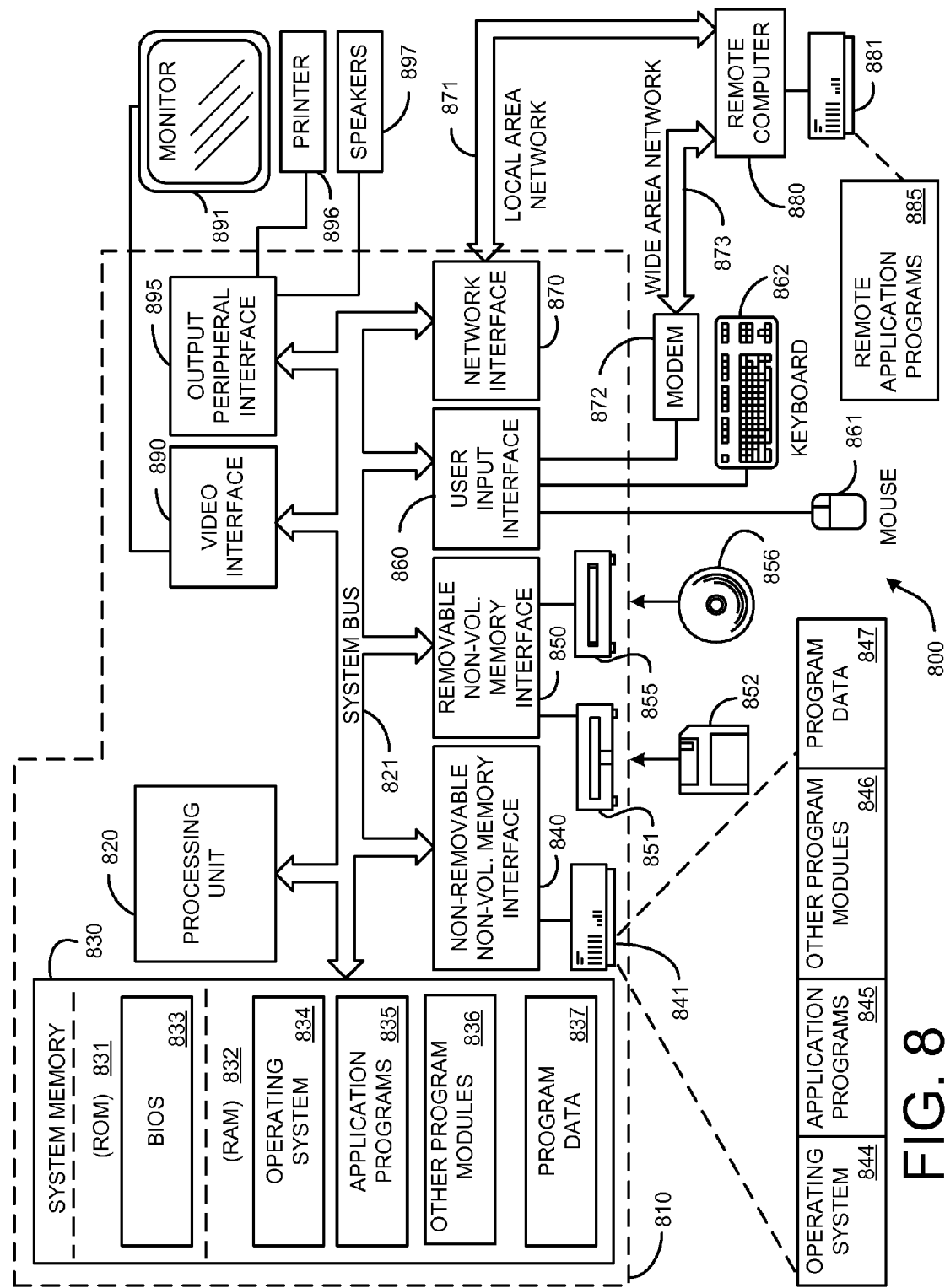
FIG. 8 illustrates an example of a suitable computing system environment in which embodiments of the temporal rule-based feature extraction system and method shown in FIGS. 1-7 may be implemented.

FIG. 8 illustrates an example of a suitable computing system environment in which embodiments of the temporal rule-based feature extraction system 100 and method shown in FIGS. 1-7 may be implemented. The computing system environment 800 is only one example of a suitable computing environment and is not intended to suggest any limitation as to the scope of use or functionality of the invention. Neither should the computing environment 800 be interpreted as having any dependency or requirement relating to any one or combination of components illustrated in the exemplary operating environment.

Embodiments of the temporal rule-based feature extraction system 100 and method are operational with numerous other general purpose or special purpose computing system environments or configurations. Examples of well known computing systems, environments, and/or configurations that may be suitable for use with embodiments of the temporal rule-based feature extraction system 100 and method include, but are not limited to, personal computers, server computers, hand-held (including smartphones), laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

Embodiments of the temporal rule-based feature extraction system 100 and method may be described in the general context of computer-executable instructions, such as program modules, being executed by a computer. Generally, program modules include routines, programs, objects, components, data structures, etc., that perform particular tasks or implement particular abstract data types. Embodiments of the temporal rule-based feature extraction system 100 and method may also be practiced in distributed computing environments where tasks are performed by remote processing devices that are linked through a communications network. In a distributed computing environment, program modules may be located in both local and remote computer storage media including memory storage devices. Still further, the aforementioned instructions could be implemented, in part or in whole, as hardware logic circuits, which may or may not include a processor. With reference to FIG. 8, an exemplary system for embodiments of the temporal rule-based feature extraction system 100 and method includes a general-purpose computing device in the form of a computer 810.

Components of the computer 810 may include, but are not limited to, a processing unit 820 (such as a central processing unit, CPU), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 810 typically includes a variety of computer readable media. Computer readable media can be any available media that can be accessed by the computer 810 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 810. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within the computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable, volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. A user may enter commands and information (or data) into the computer 810 through input devices such as a keyboard 862, pointing device 861, commonly referred to as a mouse, trackball or touch pad, and a touch panel or touch screen (not shown).

Other input devices (not shown) may include a microphone, joystick, game pad, satellite dish, scanner, radio receiver, or a television or broadcast video receiver, or the like. These and other input devices are often connected to the processing unit 820 through a user input interface 860 that is coupled to the system bus 821, but may be connected by other interface and bus structures, such as, for example, a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include a local area network (LAN)

871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on memory device 881. It will be appreciated that the network connections shown are exemplary and other means of establishing a communications link between the computers may be used.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A method for processing a trace containing a plurality of events, comprising:
    finding a temporal-based rule satisfied by the trace;
    extracting a feature from the trace based on the temporal-based rule by leveraging extrinsic properties of the temporal-based rule that are independent of an internal structure of the temporal-based rule; and
    processing the trace based on the feature using a computing device.

2. The method of claim 1, further comprising using as the feature the temporal-based rule.

3. The method of claim 2, further comprising using as a feature a single temporal-based rule that captures orderings between events of the trace.

4. The method of claim 2, further comprising using as a feature a set of temporal-based rules containing a plurality of temporal-based rules.

5. The method of claim 4, further comprising:
    defining a normalized support for each rule in the set of temporal-based rules; and
    defining a rule frequency feature as a mapping of each rule in the set of temporal-based rules to their normalized supports.

6. The method of claim 1, further comprising extracting the feature from the temporal-based rule by leveraging intrinsic properties of the temporal-based rule that are dependent on an internal structure of the temporal-based rule.

7. The method of claim 6, further comprising:
    computing a set of abstraction position pairs for the temporal-based rule;
    computing a summary of distance measures for the set of abstraction position pairs for the trace using a summarizing function; and
    defining a distance feature as a mapping of each abstraction position pair to the summary of distance measures given by the summarizing function.

8. The method of claim 6, further comprising:
    computing a set of abstraction position pairs for the temporal-based rule;
    computing witness distances as a collection of distances between each abstraction position pair of each witness to the temporal-based rule; and
    defining a distance frequency feature as a mapping of the witness distances to a normalized frequency.

9. A method for identifying differences between a first trace and a second trace, comprising:
    extracting a first temporal rule-based feature from a first temporal-based rule satisfied by the first trace; and
    extracting a second temporal rule-based feature from a second temporal-based rule satisfied by the second trace; and
    identifying differences between the first trace and the second trace using the first temporal rule-based feature and the second temporal rule-based feature using a computing device.

10. The method of claim 9, further comprising:
    finding a third temporal-based rule that is not satisfied by the first trace or the second trace;
    noting a triggering event of the third temporal-based rule; and
    identifying the triggering event as a difference between the first trace and the second trace with respect to the third temporal-based rule.

11. The method of claim 9, further comprising:
    determining that the first temporal-based rule and the second temporal-based rule are a same temporal-based rule such that the first trace and the second trace both satisfy the same temporal-based rule;
    determining an extent of deviation between the first trace and the second trace as captured by the same temporal-based rule;
    finding other temporal-based rules that are satisfied by the first trace and second trace; and
    ranking each of the temporal-based rules based on the extent of deviation between the first trace and the second trace as captured by each of the temporal-based ruled.

12. The method of claim 11, further comprising using the ranking of the temporal-based rules to identify the differences between the first trace and the second trace.

13. The method of claim 9, further comprising:
    determining that the first temporal-based rule and the second temporal-based rule are a same temporal-based rule such that the first trace and the second trace both satisfy the same temporal-based rule;
    finding position pairs in the same temporal-based rule; and
    ranking the position pairs based on an extent of deviation between the first trace and the second trace as captured by the same temporal-based rule.

14. The method of claim 13, further comprising using the ranking of the position pairs to identify the differences between the first trace and the second trace.

15. The method of claim 9, further comprising:
    determining that the first temporal-based rule and the second temporal-based rule are a same temporal-based rule such that the first trace and the second trace both satisfy the same temporal-based rule;
    finding an abstraction position pair in the same temporal-based rule;

determining a set of distances in the abstraction position pair that differ in terms of frequency in the first trace and the second trace;

determining a set of witnesses having a distance in the set of distances for the abstraction position pair; and identifying the differences between the first trace and the second trace using at least one of the witnesses in the set of witnesses.

16. A temporal rule-based feature extraction system for extracting features from temporal-based rules, comprising:

a set of temporal-based rules satisfied by a trace;

a feature definition module for defining features based on the temporal-based rules and temporal relations of events in the trace;

a temporal rule-based feature obtained from the feature definition module;

a similarity measure module for defining a similarity measure for the temporal rule-based feature; and a comparison module for solving feature extraction problems by using the temporal rule-based feature and the corresponding similarity measure to compare the trace to other traces.

17. The temporal rule-based feature extraction system of claim 16, further comprising:

a set of traces that include the trace; and clusters of traces created by the comparison module such that each trace in the cluster of traces captures a same behavior.

18. The temporal rule-based feature extraction system of claim 16, further comprising:

a plurality of trace sets such that each trace set contains traces that capture similar behavior and satisfy a same temporal-based rule;

a distance metric that identifies a closest trace to the trace; and a classification of the trace for inclusion in one of the plurality of trace sets based on the distance metric.

19. The temporal rule-based feature extraction system of claim 16, further comprising:

a collection of features extracted from temporal-based rules satisfied by the trace;

a fingerprint of the trace that uniquely identifies the trace based on the collection of features.

* * * * *